United States Patent [19]

Berry

[11] Patent Number: 5,546,519
[45] Date of Patent: Aug. 13, 1996

[54] SYSTEM AND METHOD FOR VISUALLY PROGRAMMING ITERATION

[75] Inventor: Richard E. Berry, Georgetown, Tex.

[73] Assignee: International Business Machines Corporation, Armonk, N.Y.

[21] Appl. No.: 203,142

[22] Filed: Feb. 28, 1994

[51] Int. Cl.$^6$ ............................................. G06F 3/14
[52] U.S. Cl. ............................ 395/155; 395/161
[58] Field of Search .......................... 395/700, 50, 51, 395/155, 161, 650

[56] References Cited

U.S. PATENT DOCUMENTS

| | | | |
|---|---|---|---|
| 4,982,344 | 1/1991 | Jordan | 395/157 |
| 5,195,172 | 5/1993 | Elad et al. | 395/50 |
| 5,287,511 | 2/1994 | Robinson et al. | 395/700 |
| 5,303,379 | 4/1994 | Khoyi et al. | 395/700 |
| 5,325,533 | 6/1994 | McInerney et al. | 395/700 |
| 5,428,712 | 6/1995 | Elad et al. | 395/51 |

OTHER PUBLICATIONS

"User–Controlled Display of Hypermedia Links", IBM Technical Disclosure Bulletin, vol. 36, No. 9B, Sep. 1993, p. 163.
"Distributed Hypertext Links Objects", IBM Technical Disclosure Bulletin, vol. 34, No. 11, Apr. 1992, p. 61.
"User Model and Design with Link as an Object", Research Disclosure, Oct. 1992.
"Link Control User Interface", Research Disclosure, Oct. 1992, No. 342.
"Fabrik: A Visual Programming Environment", D. Ingalls et al, ACM, 1988, 0–89791–284–5/88/0009/0176, OOPSLA 1988 Proceedings, pp. 176–190.
"The Visual Development Environment: More Than Just a Pretty Face?", C. Petzold, PC Magazine, vol. 11, No. 11, Jun. 6, 1992, pp. 195–237.
"LabView: Laboratory Virtual Instrument Engineering Workbench", G. M. Vose et al, BYTE Magazine, vol. 11, No. 9, Sep. 1988, pp. 84–92.

*Primary Examiner*—Mark R. Powell
*Assistant Examiner*—Ruay Lian Ho
*Attorney, Agent, or Firm*—Diana L. Roberts

[57] ABSTRACT

A method, program product, and system create visual representations of iterator link objects. A graphical user interface of the present invention enables users to visually program iterative applications without having to use a programming language. The graphical user interface includes an iterator link object which is capable of removably linking a source object having multiple elements to a target object. On the occurrence of a trigger event, an action iterates over each individual element of the source object and is targeted to the target object. Therefore, the present invention enables the user to visually link multiple source objects to a target object. Furthermore, by utilizing more than one iterator link object, linked objects can be chained linked to other linked objects.

18 Claims, 8 Drawing Sheets

701 ~ {Event handling routine for link object}
...
703 ~ case mouseEvent of
  705 ~ dropped:
    707 ~ case droppedComponent of
      709 ~ sourceHandle:
        711 ~ sourceObject=builder.droppedOn(sourceHandle.extent);
      713 ~ targetHandle:
        715 ~ targetObject = builder.droppedOn(targetHandle.extent);
      717 ~ triggerHandle:
        719 ~ triggerObject = builder.droppedOnObject(triggerHandle.extent);
      721 ~ endCase;
    723 ~ if sourceObject<> null OR targetObject<> null then
      725 ~ setPropertyValues;
      727 ~ displayPropertiesWindows;
...
730 ~ {handle other types of events}
...
732 ~ {Event handling routine for link properties window}
...
734 ~ case selectionEvent of
  736 ~ sourceObject:
    738 ~ link.sourceObject = sourceObjectList.currentSelection;
  740 ~ sourceEvent:
    742 ~ link.sourceEvent = sourceEventList.currentSelection;
  744 ~ sourceElements:
    746 ~ link.sourceElement = sourceElementList.currentSelection;
  748 ~ targetObject:
    750 ~ link.targetObject = targetObjectList.currentSelection;
  752 ~ targetAction:
    754 ~ link.targetAction = targetActionList.currentSelection;
  756 ~ iterateCount:
    758 ~ link.iterateCount = iterateCountList.currentSelection;
  760 ~ termination Criteria:
    762 ~ link.terminationCriteria = terminationCriteriaList.currentSelection;
  764 ~ endCase;
...
770 ~ {handle other property window events}

FIG. 7

801 — {Event handling for the pushbutton}
...
803 — case Event of
  805 — clicked:
    807 — while not endOfLinkTable do
      809 — linkVariable = linkTable.getNextLink;
      811 — linkVariable.trigger;
  813 — pressed:
    ...
    815 — {handle pressed event}
    ...
  817 — released:
    ...
    819 — {handle released event}
    ...
821 — {handling of other types of events}

830 — {Event handling for the link}
...
832 — case Event of
  834 — trigger:
    836 — while not terminationCriteria do
      838 — targetObject.targetAction (sourceObject.nextElement);
    840 — endWhile;
    842 — trigger(chain);
    ...
  844 — {handle other types of events}
    ...
  846 — endCase;

FIG. 8

SYSTEM AND METHOD FOR VISUALLY PROGRAMMING ITERATION

BACKGROUND OF THE INVENTION

1. Field of the Invention

The present invention relates to a user interface technique that enables iteration in visual programming and, more particularly, but not by way of limitation, to iterator link objects.

2. Description of the Related Art

The user interfaces of existing visual programming products allow users to visually create simple event-action sequences. For example, some visual programming products allow the user to visually "link" a source object, such as a pushbutton or data file, to a target object, such as a database or entry field. The link recognizes specific "events" of the source object, such as click, press, release, double click, etc., or specific states of the source object. When the event occurs, the link sends a message to the target object. The target object then performs specific data processing (e.g., delete, insert, clear, append, etc.) in accordance with the received message. As such, the contents of the link are referred to as an event-message pair. The event-message pair identifies the source object, source event, target object, and target action. Illustratively, using a visual builder screen, a user can link a pushbutton icon to an entry field icon so that when the user clicks the pushbutton icon with the pointer of a mouse, the entry field clears.

Links may be implemented as objects. Link objects provide the user with common object behaviors and, thus, can be manipulated like other objects. For example, link objects can be created from link template icons, copied to a clipboard and pasted elsewhere, dragged to a trashcan and deleted, and opened to display their properties. Consequently, link objects help provide a user, particularly a novice user, with a visual programming environment for developing application programs.

Conventionally, link object graphics have three components. Two of the components are link handles and one component is a link connector. A user moves (e.g. drags) each handle across the display screen with the assistance of a pointer and a pointing device, such as a mouse, and places (e.g. drops) each handle over another object. The link connector continuously follows the pointer during direct user manipulation and then appears between the two link handles when the link is established. If desired, the resulting link object's event/message pair can be modified by opening the link object to display its properties.

Conventional link objects, however, suffer significant limitations and disadvantages when the user desires to build more sophisticated applications. Illustratively, a user may often desire to insert a multiple element source object, such as an array of fifty names, into a target object, such as a database. Therefore, the link object must be capable of repeating (i.e., iterating) the insert action for each element of the array. Further, the user may desire to insert the array of names into several databases.

To create these applications using current tools, the user must utilize a suitable programming language, such as BASIC, Smalltalk, or C++, to program the iteration of these applications. Unfortunately, users are often unfamiliar with these programming languages and, therefore, cannot build applications that use iteration. Therefore, because many applications require iteration, a great demand exists for a visual representation of iteration. Such a representation would allow non-programmers to create iterative applications without having to learn a programming language.

SUMMARY OF THE INVENTION

In accordance with the present invention, a method, program product, and system enable a user to visually program iterative applications using an iterator link object. A graphical user interface of the present invention creates an iconic representation of the iterator link object. The iterator link object allows the user to removably link a source object having multiple elements to a target object. On the occurrence of a trigger event, the iterator link object iterates an action over each individual element of the source object and is targeted toward the target object. As a result, the user can visually link source objects having multiple elements, such as an array of names, to a target object. Consequently, iterator link objects enable users to visually program applications that require iteration without having to use a programming language. Furthermore, by utilizing more than one iterator link object, linked objects can be chained linked to other linked objects.

BRIEF DESCRIPTION OF THE DRAWINGS

FIG. 7 is a listing of code that sets forth the logic flow for event handling associated with the link object and properties window in accordance with the preset invention.

FIG. 8 is a listing of code that sets forth the logic flow for event handling associated with the trigger object and iteration in accordance with the present invention.

DETAILED DESCRIPTION OF THE PREFERRED EMBODIMENT

Figure 1:
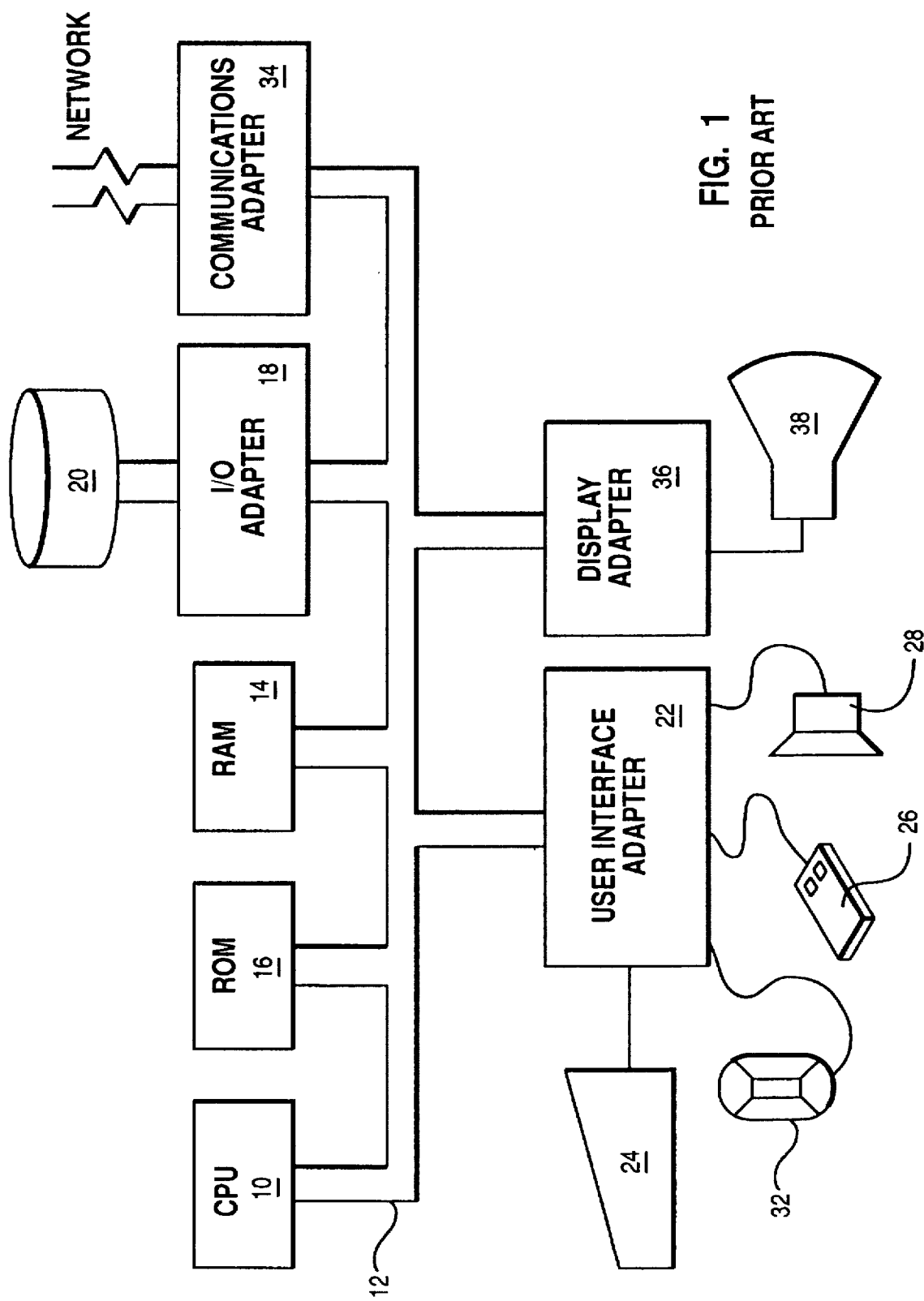
FIG. 1 is a block diagram of a prior art computer system for use with the present invention.

The present invention is preferably practiced in a suitable representative hardware configuration, such as the hardware configuration illustrated in FIG. 1. Workstation 100 comprises any suitable central processing unit 10, such as a conventional microprocessor, and a number of other units interconnected via system bus 12. Illustratively, workstation 100 comprises Random Access Memory (RAM) 14, Read Only Memory (ROM) 16, display adapter 36 for connecting system bus 12 to display device 38, and I/O adapter 18 for connecting peripheral devices (e.g. disk and tape drives 20) to system bus 12. Workstation 100 further comprises user interface adapter 22 for connecting keyboard 24, mouse 26, speaker 28, microphone 32, and/or other user interface devices, such as a touch screen device (not shown), to system bus 12. Communication adapter 34 connects workstation 100 to a data processing network.

The present invention comprises a computer program which resides within a machine-readable media to direct the operation of workstation 100. Any suitable machine-readable media may retain the computer-program, such as RAM 14, ROM 16, a magnetic diskette, magnetic tape, or optical disk (the last three being located in disk and tape drives 20). The program controls workstation 100 to visually build an iterative link object and display it on display device 38 (described herein).

The present invention may be incorporated into any suitable visual programming product, such as word processors, spreadsheets, WINDOWS®, UNIX® operating system, AIX® operating system, OS/2® operating system, Mircosoft's® VisualBasic, or Digitalk's® PARTS Visual Builder. Illustratively, by incorporating the present invention into a suitable word processor, the user can visually create a macro or script that provides some word processing function iteratively over selected portions of the document.

Figure 2:
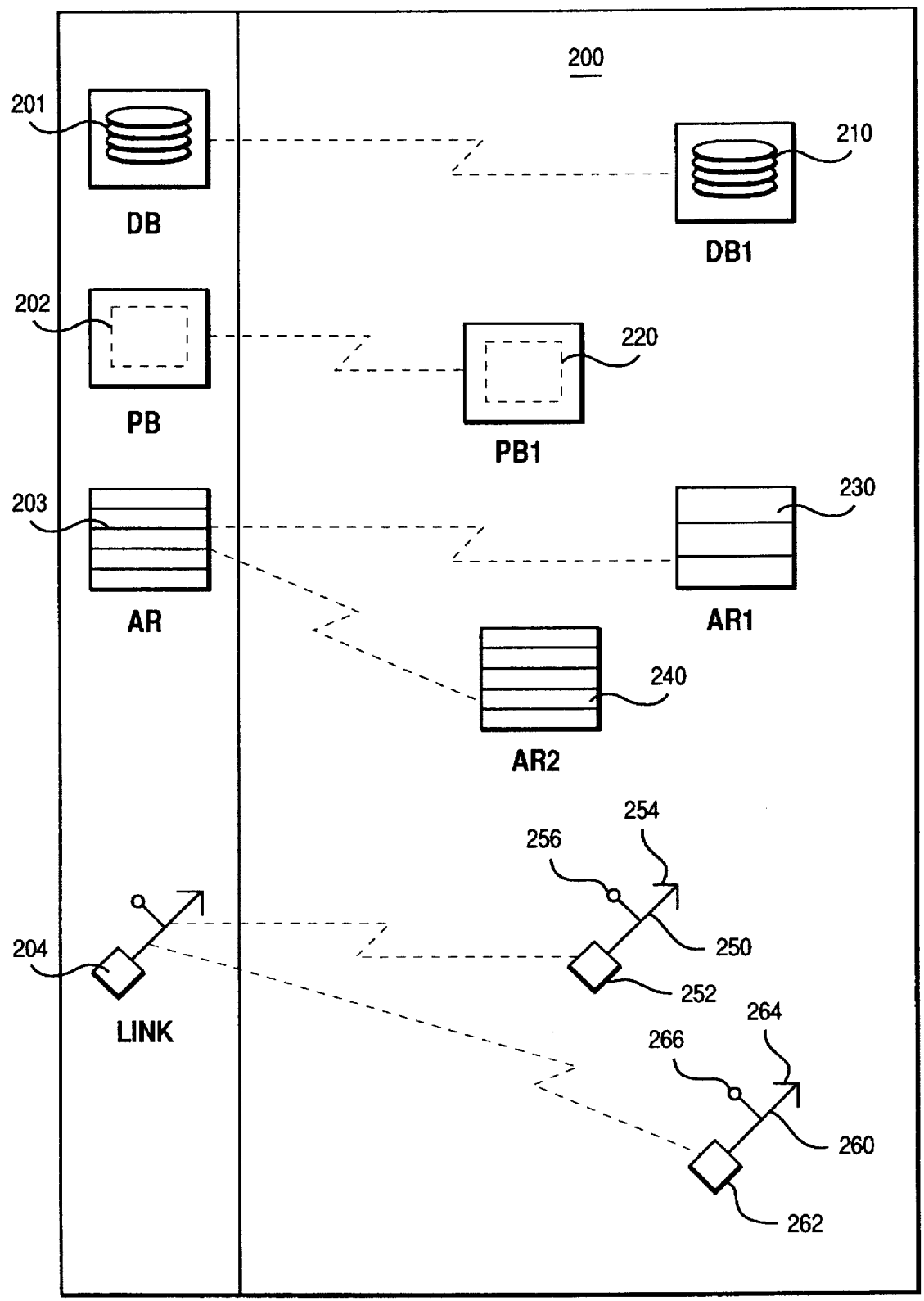
FIG. 2 is an illustration of a display having icons disposed thereon for implementing the present invention.

Referring to FIG. 2, visual builder 200 implements the present invention. Builder 200 may be a full screen display as found in a DOS system, or any suitable window, such as a window in Microsoft's Windows®, Motif®, or OS/2®. For the representative hardware illustrated in FIG. 1, the user views builder 200 on display device 38. The left area of builder 200 can display numerous building icons. However, in this example, builder 200 displays database icon 201, pushbutton icon 202, array icon 203, and iterator link icon 204. The icons illustrated in FIG. 2 are for representation only. Other icon shapes, sizes, or objects may be used. The user may copy icons into visual builder 200 by positioning a pointer over an icon, pressing a pointing device (e.g., mouse) to individually drag it within visual builder 200, and releasing the pointing device to drop it within visual builder 200. The order of this operation is irrelevant because each icon exists independently. In this example, the user has dragged and dropped instances of icons 201, 202, 203, and 204 within builder 200.

Icon 210 represents a database (herein DB1 210), icon 220 represents a pushbutton (herein PB1 220), icon 230 represents an array having three elements (herein AR1 230), icon 240 represents an array having six elements (herein AR2 240), icon 250 represents an iterator link (herein link1 250), and icon 260 represents another iterator link (herein link2 260). One skilled in the art would readily recognize that link1 250 and link2 260 can be displayed in numerous forms. In the preferred embodiment, link1 250 includes source handle 252, target handle 254, and trigger handle 256, while link2 260 includes source handle 262, target handle 264, and trigger handle 266.

Figure 3:
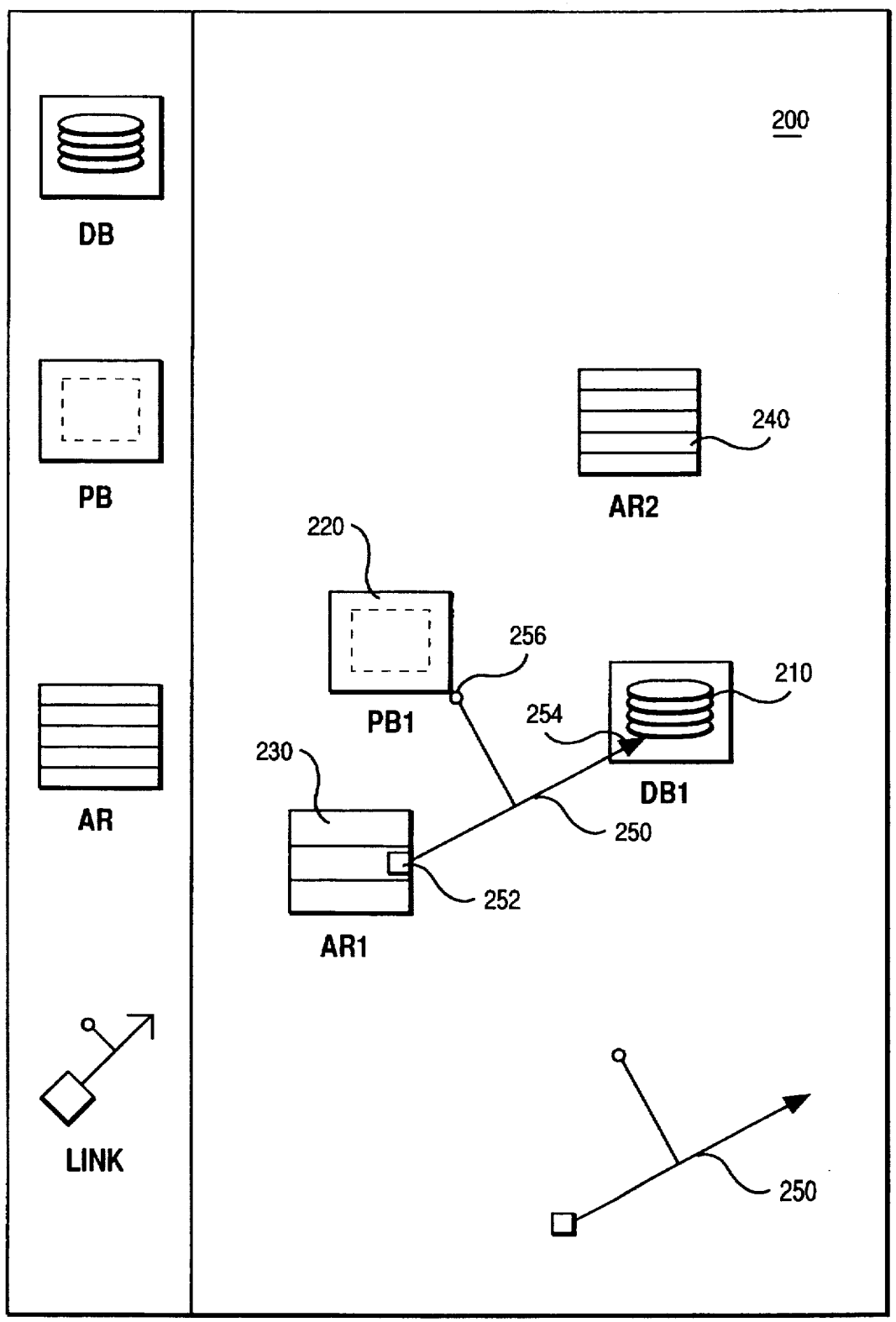
FIG. 3 is an illustration of the display having the icons linked together in accordance with the present invention.

Referring to FIG. 3, in a first example, the user desires to link AR1 230 (i.e., source object) to DB1 210 (i.e., target object) such that on the event of clicking PB1 220, each element of AR1 230 is inserted into DB1 210. The user also desires for the link to conclude upon the insertion of the last element.

The user may choose one of several alternatives to implement this first example. The first alternative has several steps. First, after the user has dragged and dropped the appropriate icons into builder 200 (see FIG. 2), the user positions the pointer over source handle 252 of link1 250 and presses the pointing device to drag it over AR1 230. Upon releasing the pointing device, source handle 252 connects to AR1 230. Second, the user then positions the pointer over target handle 254 and presses the pointing device to drag it over DB1 210. Upon releasing the pointing device, target handle 254 connects to DB1 210, thereby linking AR1 230 to DB1 210. Finally, the user positions the pointer over trigger handle 256 and presses the pointing device to drag it over PB1 220. Upon releasing the pointing device, trigger handle 256 connects to PB1 220. Alternately, the user can link AR1 230 to DB1 210 by displaying and subsequently changing the properties of link1 250 (described herein). Furthermore, the user can link AR1 230 to DB1 210 by clicking a "link drawing tool" from a tool palate (not shown) and then "drawing" a link from AR1 230 to DB1 210.

At this point, the user may desire to display the properties of link1 250. To do this, the user positions the pointer over link1 250 and double clicks the pointing device. As a result, a window containing various properties of link1 250 appears. However, those skilled in the art readily recognize that other techniques within the scope and spirit of the present invention can be used to display the properties of link1 250.

Figure 4:
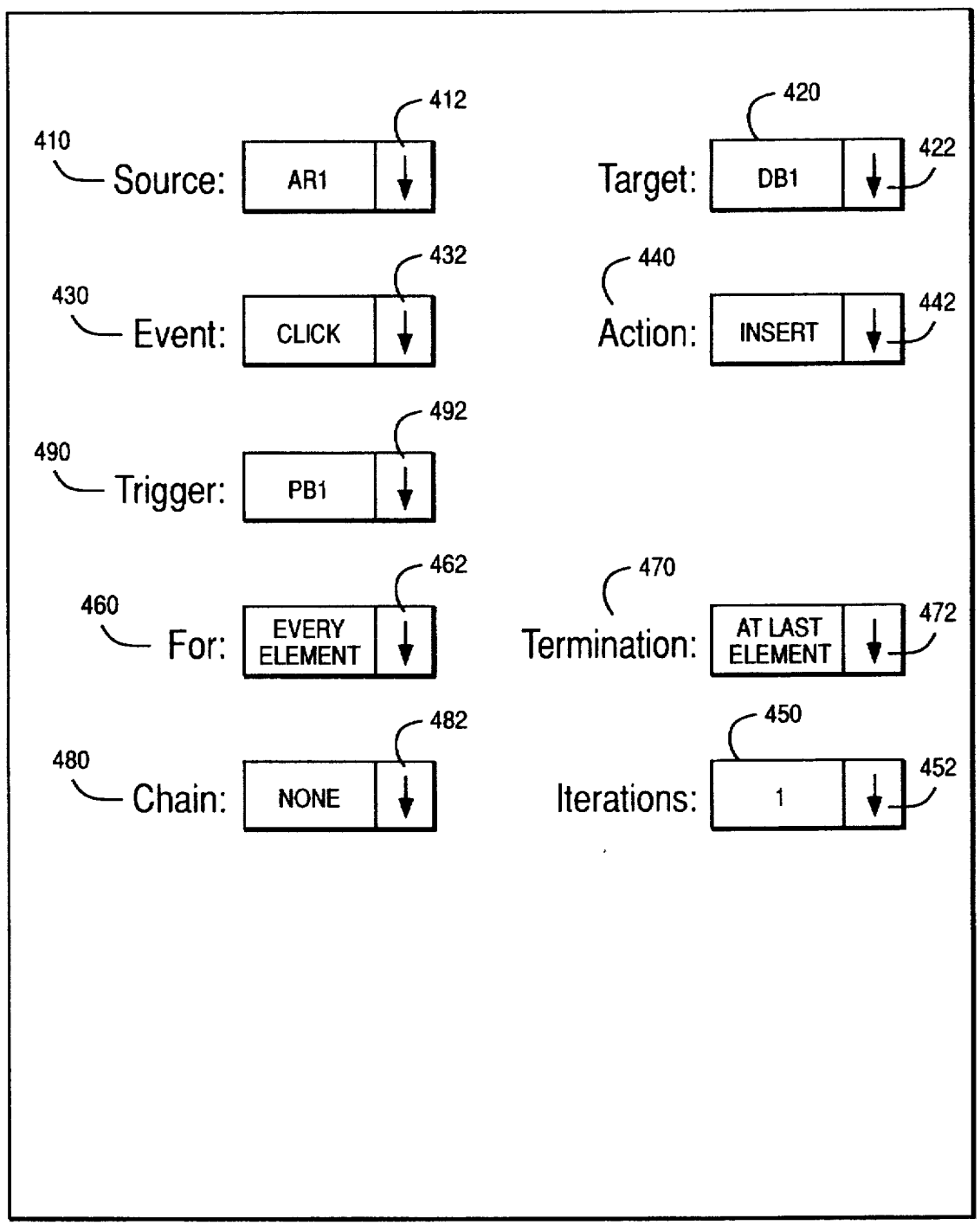
FIG. 4 is an illustration of a properties window associated with an iterator link object in accordance with the present invention.

Referring to FIG. 4, window 400 displays the various properties of link1 250. Source property 410 indicates that the source object is AR1, while target property 420 indicates that the target object is DB1. Further, trigger property 490 indicates that the trigger object is PB1, event property 430 indicates that the action is "clicking", action property 440 indicates that the event is "insert", iteration property 450 indicates that the number of iterations is "one", "for" property 460 indicates that every element of the source will be inserted into DB1, termination property 470 indicates that the link terminates when the last element of AR1 is inserted into DB1, and chain property 480 indicates that no chain links exist.

Whether connected to other objects or not, link1 250 automatically sets the values of properties 450, 460, 470, and 480 to default settings. Those default settings can be manually changed by the user (described herein). However, if link1 250 is connected to a source, target, or trigger object, link1 250 automatically stores the settings for source property 410, target property 420, trigger property 490, event property 430, or action property 440, where appropriate, in properties window 400. Furthermore, the default setting for event property 430 (e.g., click) depends on the type of trigger object selected. For example, if the trigger object had been a slide bar, the default setting would be "change". Similarly, the setting for action property 440 (e.g., insert) depends on the type of target object selected.

On the other hand, if link1 250 is not connected to another object, source property 410, target property 420, trigger property 490, event property 430, and action property 440 are empty. The user can individually enter a setting for each of these properties by positioning the pointer on "arrow" sections 412, 422, 432, 442, 452, 462, 472, and 482 of the appropriate property and clicking the pointing device. A resulting drop-down list appears with various settings. Furthermore, even if link1 250 is connected to other objects, the user can manually change the connections using this same procedure.

For example, to change the setting for source property 410, the user positions the pointer over arrow 412 and clicks the pointing device. A resulting drop-down list (not shown) appears with several settings. These settings are object identifiers (e.g., the object names) which have been dropped or created within builder 200. Referring to FIGS. 2 and 4, the drop-down list for source property 410 contains AR2, AR1, PB1, DB1, and link2. To select a setting, the user positions the pointer over the desired setting and clicks the pointing device. The setting is then stored in source property 410 of properties window 400. Consequently, the source handle for the link automatically moves and drops on (i.e., connects to) the selected source object.

Figure 5:
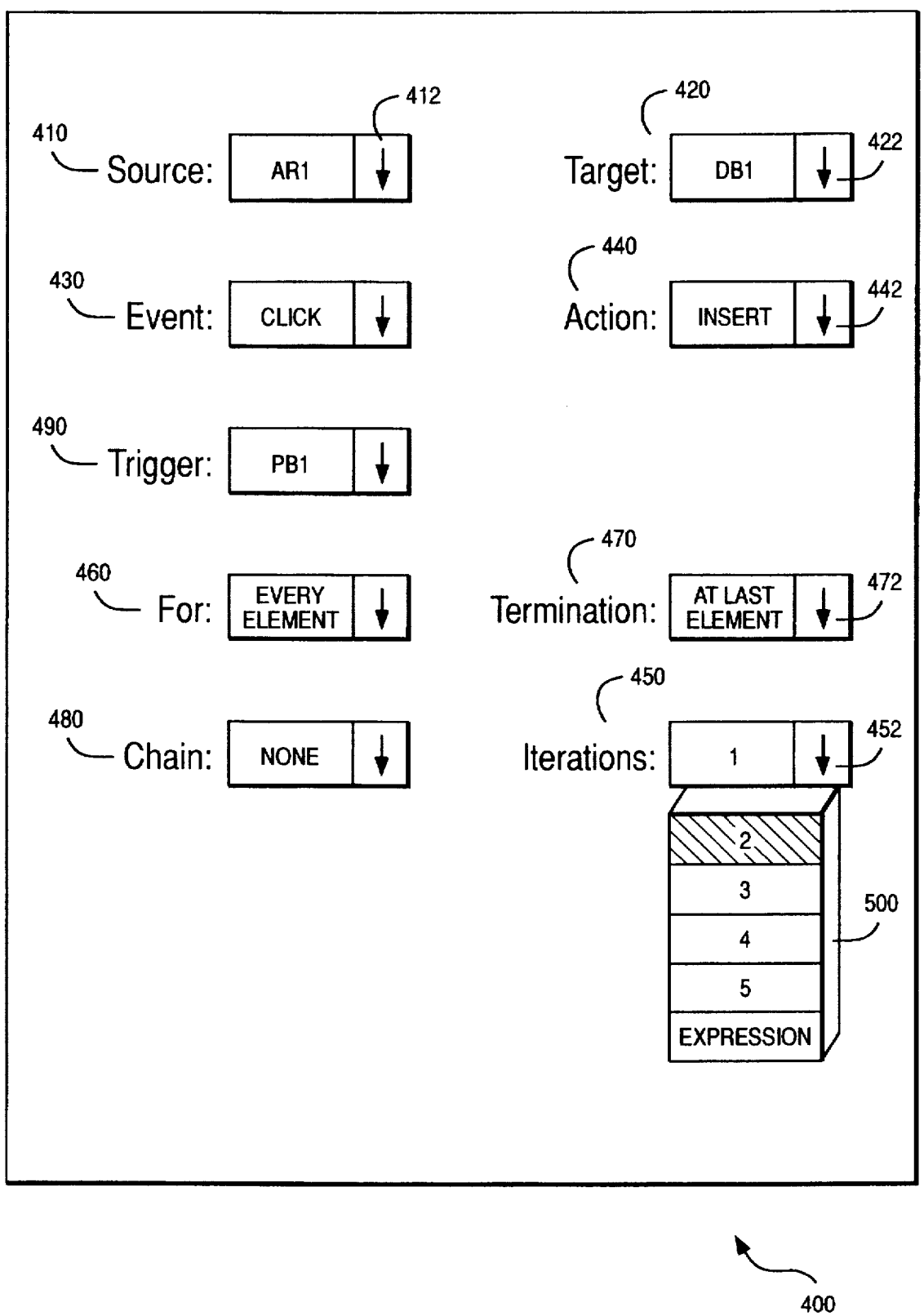
FIG. 5 is an illustration of the properties window having a drop-down list associated with a particular property.

Using this same procedure, the user can change or enter the settings for all the properties of window 400. In another example, referring to FIG. 5, the user desires to change the number of iterations. To do so, the user positions the pointer over arrow 452 of iteration property 450 and clicks the pointing device. A resulting drop-down list 500 displays several settings. To select a setting, the user positions the pointer over the desired setting and clicks the pointing device. To enter a setting not displayed in drop-down list 500, the user selects "expression". As a result, a window (not shown) appears. The user then enters an expression via, for example, a keyboard, that implements the desired setting (e.g., ArraySize×6). The number of iterations selected or entered will then be stored in iteration property 450 of properties window 400. Similarly, the user may select an "expression" setting in the drop-down lists for the "for" property 460 and termination property 470.

In still another example, the user desires to change the default setting of action property 440. To do so, the user positions the pointer over arrow 442 of action property 440 and clicks the pointing device to activate its corresponding drop-down list (not shown). Upon activation, a variety of settings appear, such as write, insert, open, append, and delete. To enter a setting, the user positions the pointer over the desired setting and clicks the pointing device. The setting is then stored in action property 440 of properties window 400.

Using the same procedures as described above, the user may change the default setting for "for" property 460 and termination property 470. The drop-down list (not shown) of "for" property 460 will display various settings, such as "first 10 elements". If selected, the first 10 elements of AR1 230 would be inserted into DB1 210. Similarly, the drop-down list (not shown) of termination property 470 will display various settings, such as "terminate after first 5 elements". If selected, iteration would stop after 5 elements of AR1 230 were inserted into DB1 210. Furthermore, as previously described, the user can select his own setting by selecting the "expression" setting in the respective drop-down list.

Figure 6:
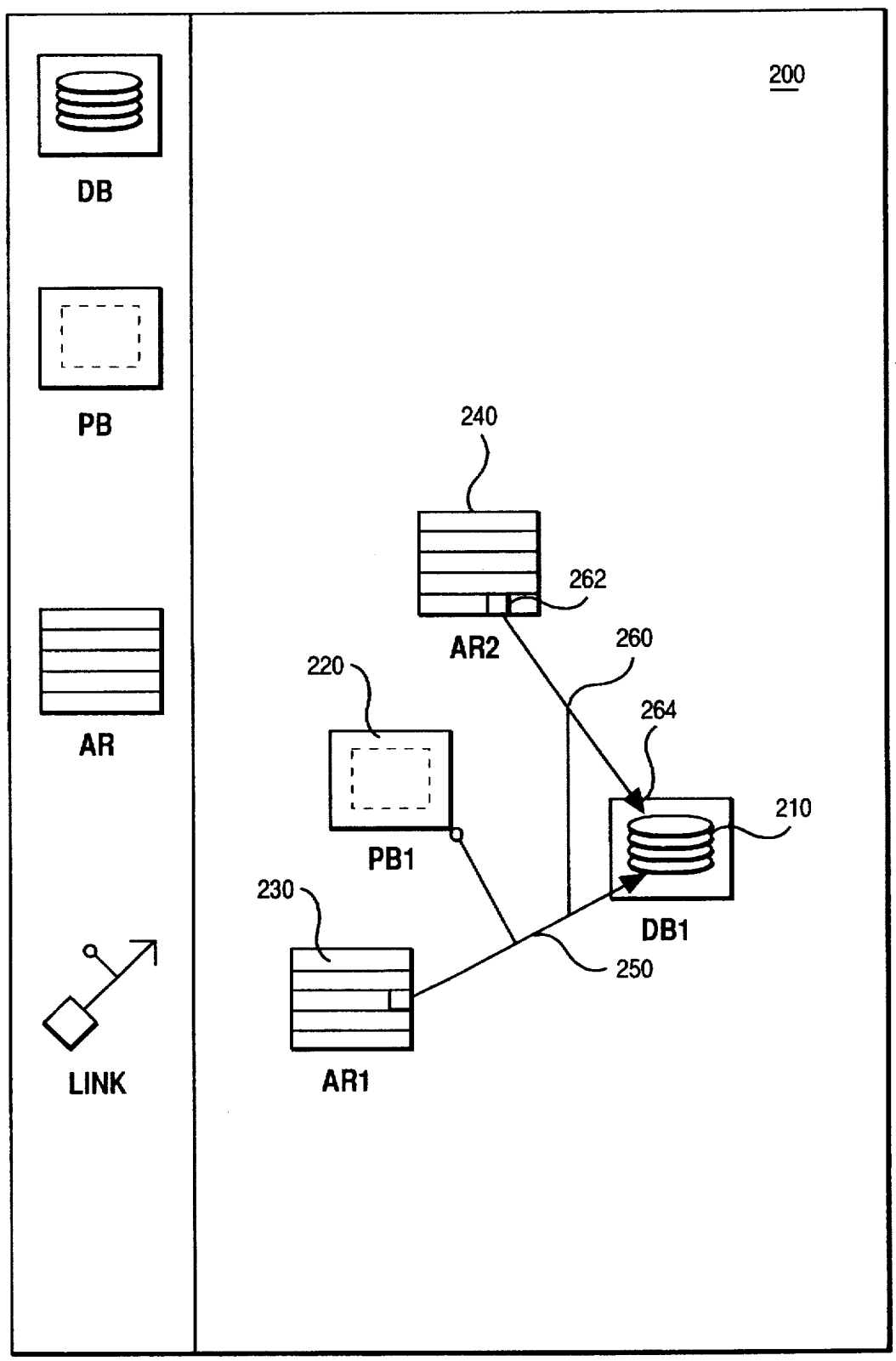
FIG. 6 is an illustration of the display having two icons chained linked to another icon in accordance with the present invention.

Moreover, the user may desire to construct more complicated applications. Illustratively, referring to FIG. 6, the user desires to insert all elements of AR1 230 and AR2 240 into DB1 210. To do so, the user establishes two links, a first link between AR1 230 and DB1 210 (i.e., link1 250) and a second link between AR2 240 and DB1 210 (i.e., link2 260). Because the user already created the first link, the user must now create the second link. The user can create the second link by using one of two methods. First, the user can drag and drop source handle 262 on AR2 240 and target handle 264 on DB1 210. Second, the user can copy link1 250 and drag/drop it to a new location within builder 200, thereby forming link2 260. The user then positions the pointer over link2 260 and double clicks the pointing device to display its properties in a window (not shown) which is similar to window 400. The user enters the appropriate settings for the source property (e.g., AR2 240) and target property (e.g., DB1 210), respectively. As a result, object handle 262 automatically connects to AR2 240 and target handle 264 automatically connects to DB1 210. Accordingly, link2 260 inserts the elements of AR2 240 into DB1 210 after all the elements of AR1 230 have been inserted into DB1 210. That is, link1 250 generates a "completed" event that is used as the trigger for link2 260.

DETAILED LOGIC

Detailed logic in the form of code are set forth in FIGS. 7 and 8. FIG. 7 illustrates event handling routine 701 for the iterator link object of the present invention. Within the event handling routine, a determination is made at 703 as to whether the event caused by a user is a mouse event or some other type of event. Next, a determination is made at 705 that a mouse event has occurred as a result of a drag/drop action by the user. A determination is made at 707 as to what the user actually dropped. At 709, a determination is made as to whether the user dropped the link's source handle. If so, a determination is made at 711 regarding the name of the object that the source handle was dropped on. Further, that name is saved in the link's source object property. If the answer is null, a determination is made that the source handle was not dropped on any object and that it remains unconnected.

At 713, a determination is made as to whether the user dropped the link's target handle on an object. If so, a determination is made at 715 as to the name of the object that the target handle was dropped on. That name is saved in the link's target object property. If the answer is null, a determination is made that the target handle was not dropped on any object and remains unconnected.

At 717, a determination is made as to whether the user dropped a trigger handle on an object. If so, a determination is made at 719 regarding the name of the object that the trigger handle was dropped on. That name is saved in the link's trigger object property. If the answer is null, a determination is made that the trigger handle was not dropped on an object and that it remains unconnected. The link has no other components to drop so the decision process ends at 721.

At 723, a determination is made as to whether the user dropped a source handle or target handle on an object. If so, default property values are established for the link at 725. The properties window is displayed at 727 to allow the user to input and modify the link's properties. At 730, events other than mouse events are handled.

At 732, event handling for changing or altering the properties window of the link begins. A determination is made at 734 as which property a user selected. A determination is made at 736 as to whether the user selected the source object property. If so, at 738, the setting selected by the user from the source list is saved in the link's source object property. If the source handle had been dropped on an object, that object's name would have been the pre-established default value for the source object property (set at 725).

At 740, a determination is made as to whether the user selected the event property. If so, at 742, the setting selected by the user from the event list is saved in the link's event property. Similarly, at 744, if the user selected the elements property, the setting selected from the elements list is saved in the link's element property at 746.

At 748, a determination is made as to whether the user selected the target object property. If so, at 750, the setting selected by the user from the target list is saved in the link's target object property. If the user had dropped the target handle on an object, that object's name would have been the pre-established default value for the target object property (set at 725).

At 752, a determination is made as to whether the user selected the action property. If so, at 754, the setting selected by the user from the action list is saved in the link's action property. Similarly, at 756, if the user selected the iteration count property, the setting selected by the user from the iteration count list is saved in the link's iteration property.

At 760, if the user selected the termination property, the setting selected by the user from the termination list is saved in the link's termination property at 762. There are no further selectable settings in the properties window to test at 764, so handling of other types of window events continues at 770.

Referring to FIG. 8, event processing for the trigger object (e.g., a pushbutton in this case) begins at 801. At 803, the type of event is examined. At 805, a determination is made as to whether the event is a "clicked" event. If so, at 807, a list of all links that are triggered by the click of the pushbutton is determined. From that list, the name of each link that is triggered by this event is determined at 809. At 811, a "trigger" message is sent to each of these links. At 813, 815, 817, 819, and 821, other types of events for the pushbutton, such as pressed and released, are handled.

Event handling for the iteration link is shown at 830. The type of event is examined at 832. At 834, a determination is made as to whether the event is "trigger" (e.g. from the pushbutton connected to the trigger handle). If so, the iteration defined by the link begins at 836. The iteration is controlled by the properties established during link creation. For example, in 836, the termination criteria controls the duration. In 838, the action is repeated for each element of the source object. Iteration continues until the termination criteria is achieved, at which time control falls through at 840. At 842, trigger messages are sent to any other links listed in a chain table associated with this link. Processing of other types of events proceeds at 844. Event processing for the link ends at 846.

While the invention has been described in terms of a preferred embodiment, those skilled in the art recognize that numerous modifications could be made and that the invention can be practiced in different hardware and software environments within the spirit and scope of the invention.

I claim:

1. A system for visually linking computer objects on a display in an object-oriented environment, comprising:

a link object represented by an icon on said display;

means for removably connecting said link object to a first system object having at least two elements and a second system object;

means for receiving an action request from a user input device; and means for iterating said action request on each of said elements of said first system object and targeting said action at said second system object.

2. The system according to claim 1 wherein said means for removably connecting said link object comprises:

means for displaying at least one property of said link object on said display; and means for changing said property to connect or disconnect said link object to said first system object and said second system object.

3. The system according to claim 2 wherein said means for displaying at least one property comprises a window having said at least one property displayed thereon.

4. The system according to claim 2 wherein said means for changing said property comprises:

a list of at least one setting associated with said property positioned within said window; and means for selecting said setting.

5. The system according to claim 1 wherein said means for performing said action request comprises:

means for displaying at least one iterative property of link object on said display; and means for changing said at least one iterative property.

6. The system according to claim 5 wherein said means for displaying at least one iterative property comprises a window.

7. A method for visually programming an application on a display in an object-oriented environment, comprising the steps of:

displaying a link object represented by an icon on said display;

removably connecting said link object to a first object and to a second object having at least two elements; and iterating an action over said elements of said second object and targeting said action toward said first object.

8. The method according to claim 7 wherein said step of removably connecting said link object comprises the steps of:

displaying at least one property of said link object on said display; and changing said property to removably connect said link object to said first object and said second object.

9. The method according to claim 8 wherein said step of displaying at least one property comprises the step of displaying a window having said at least one property displayed thereon.

10. The method according to claim 8 wherein said step of changing said property comprises the steps of:

displaying a list of at least one setting associated with said property positioned within said window; and selecting said setting.

11. The method according to claim 7 wherein said step of iterating an action comprises the steps of:

displaying at least one iterative property of said link object on said display; and changing said at least one iterative property.

12. The method according to claim 11 wherein said step of displaying at least one iterative property comprises the step of displaying a window.

13. An article of manufacture, comprising:

a computer usable medium having computer readable program code means embodied therein for controlling the operation of a computer having at least a display, the article of manufacture comprising:

computer readable program code means for controlling said computer to display on said display a link object;

computer readable program code means for controlling the computer to removably connect said link object to a first object and to a second object having at least two elements; and computer readable program code means for controlling the computer to iterate an action over said elements of said second object and target said action toward said first object.

14. The article of manufacture according to claim 13 wherein said computer readable program means for removably connecting said link object comprises:

computer readable program means for displaying at least one property of said link object on said display; and computer readable program means for changing said property to removably connect said link object to said first object and said second object.

15. The article of manufacture according to claim 14 wherein said computer readable program means for displaying at least one property comprises computer readable program means for displaying a window having said property displayed thereon.

16. The article of manufacture according to claim 15 wherein said computer readable program means for changing said at least one property comprises:

computer readable program means for displaying a list of at least one setting associated with said property positioned within said window; and computer readable program means for selecting said setting.

17. The article of manufacture according to claim 13 wherein said computer readable program means for controlling said computer to iterate an action comprises:

computer readable program means for displaying at least one iterative property of said link object on said display; and computer readable program means for changing said at least one iterative property.

18. The article of manufacture according to claim 17 wherein said computer readable program means for displaying at least one iterative property comprises computer readable program means for displaying a window.

* * * * *